E. PEUCH & A. ARBEY.
DRILLING, SCREW CUTTING, AND OTHER SIMILAR MACHINE.
APPLICATION FILED JULY 17, 1913. RENEWED DEC. 18, 1917.
1,254,933.
Patented Jan. 29, 1918.
5 SHEETS—SHEET 1.
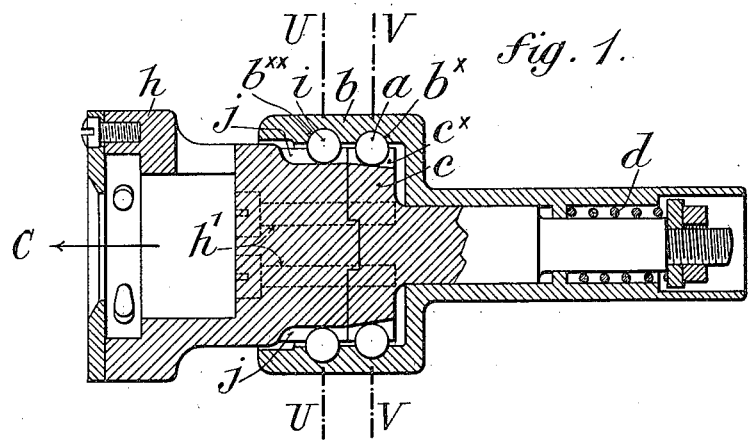
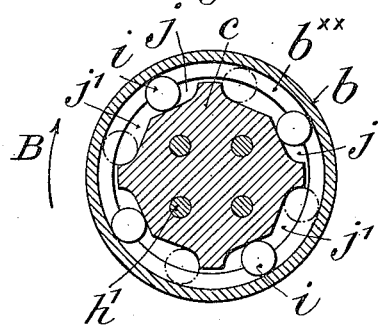
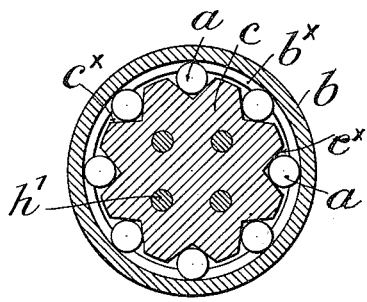

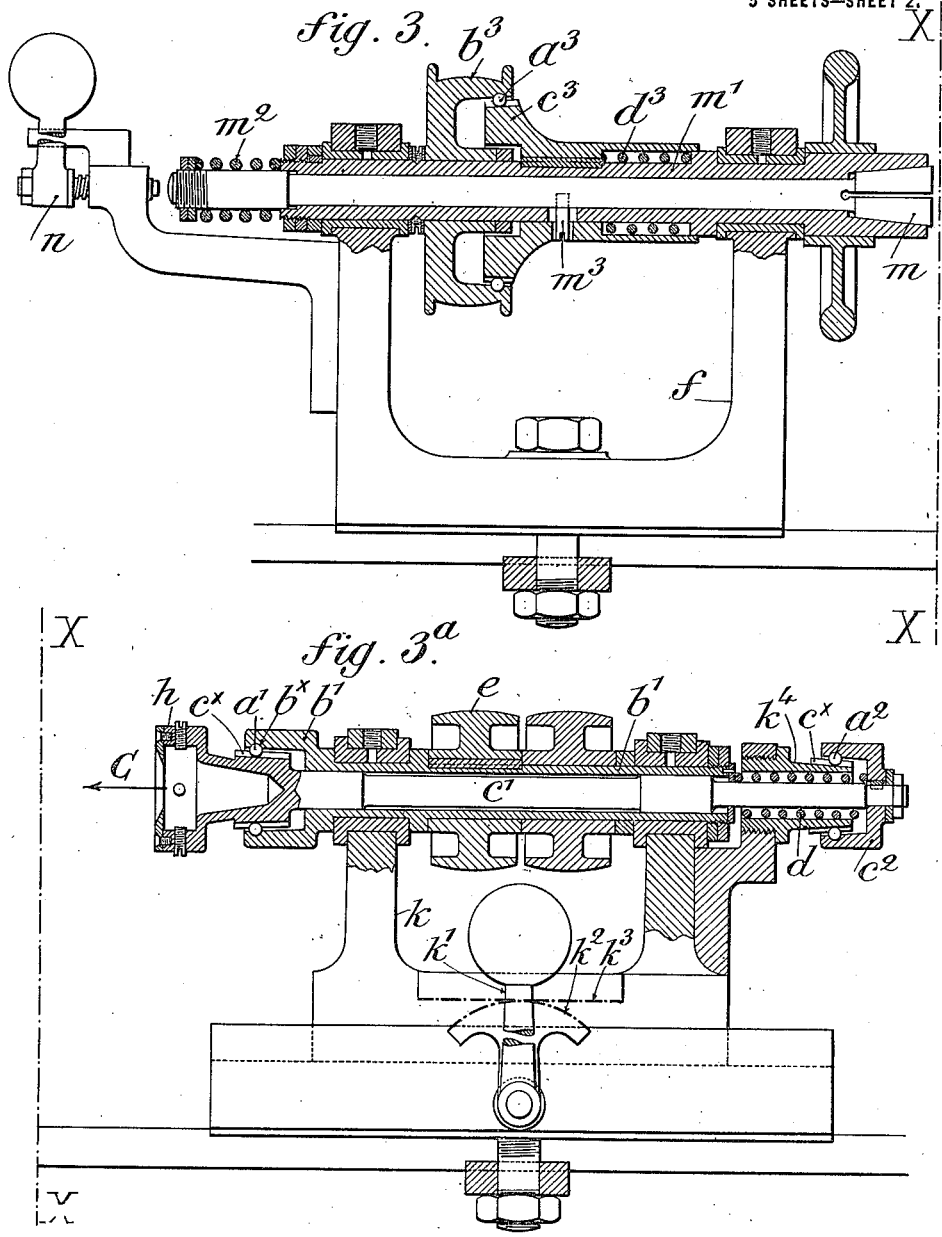

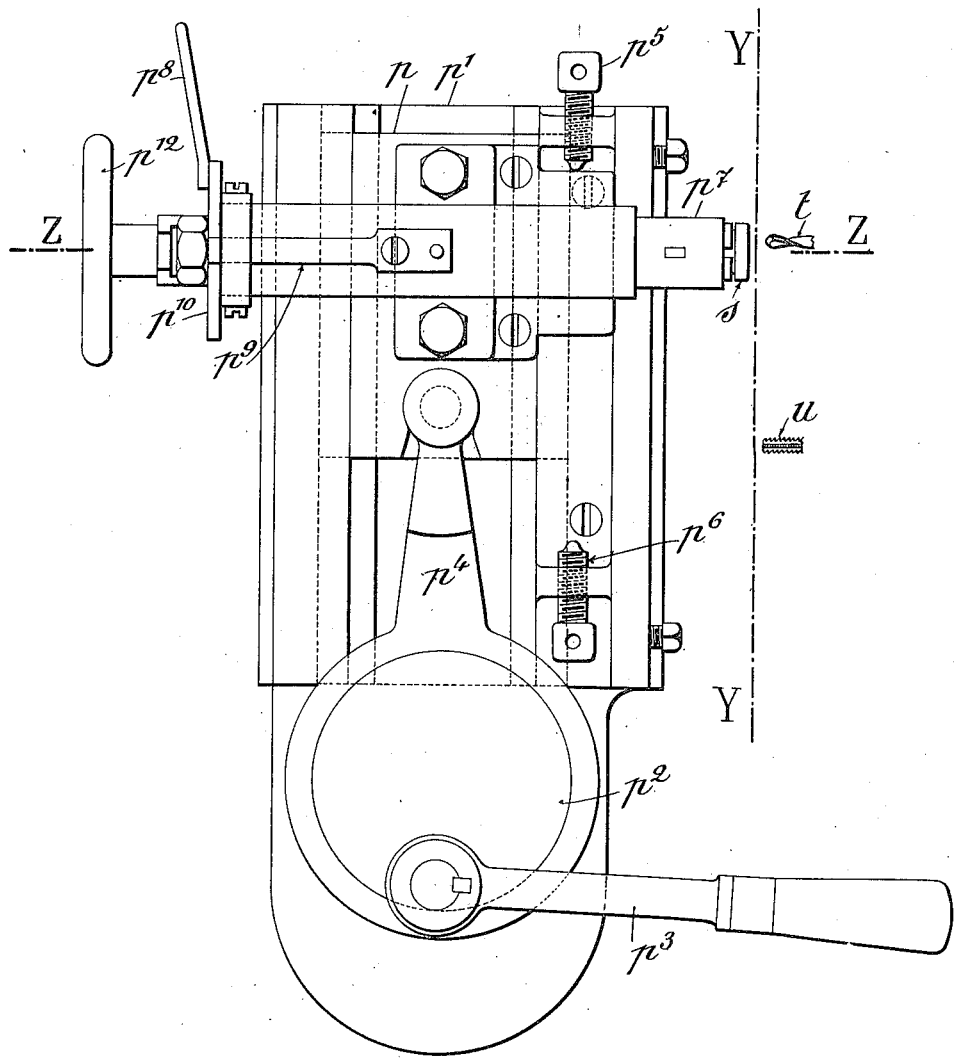

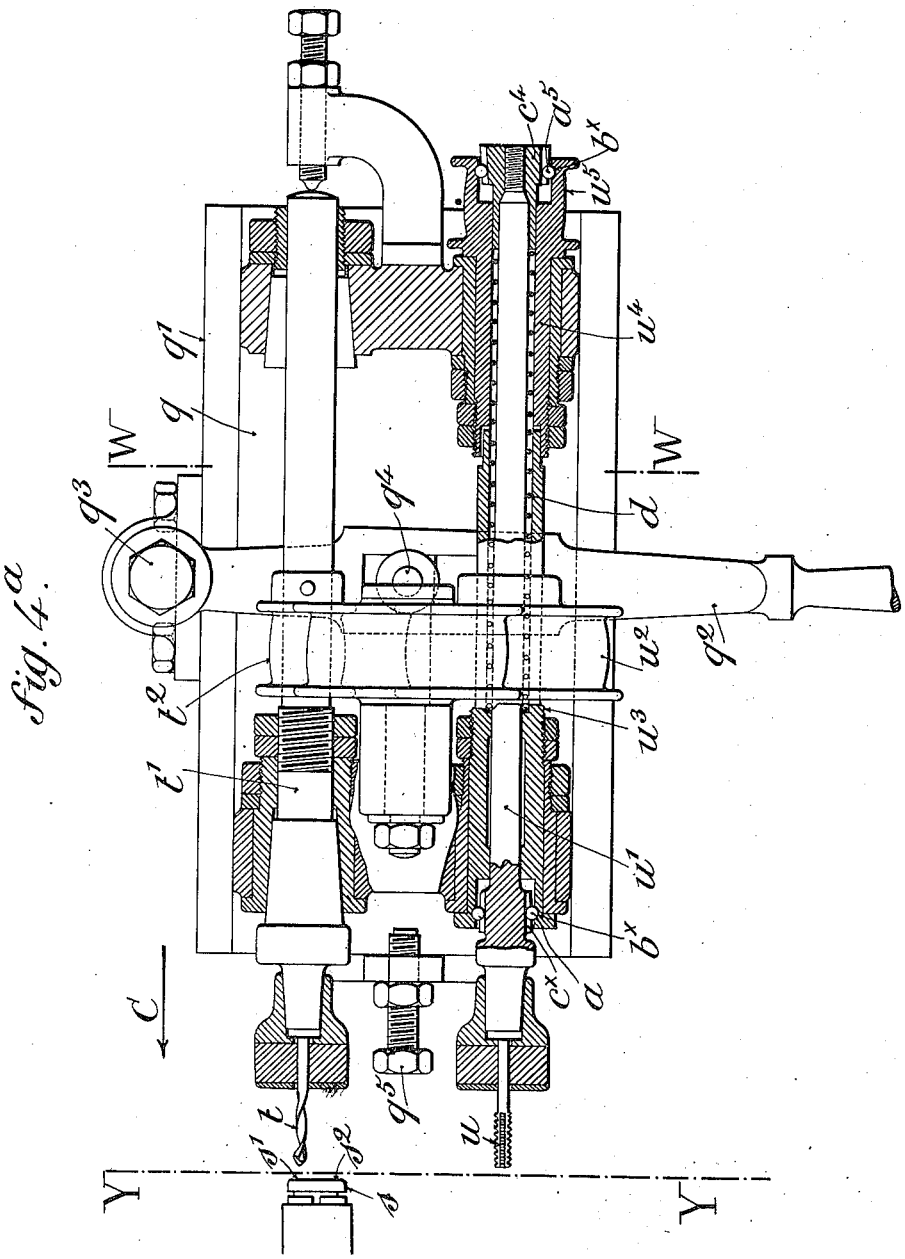

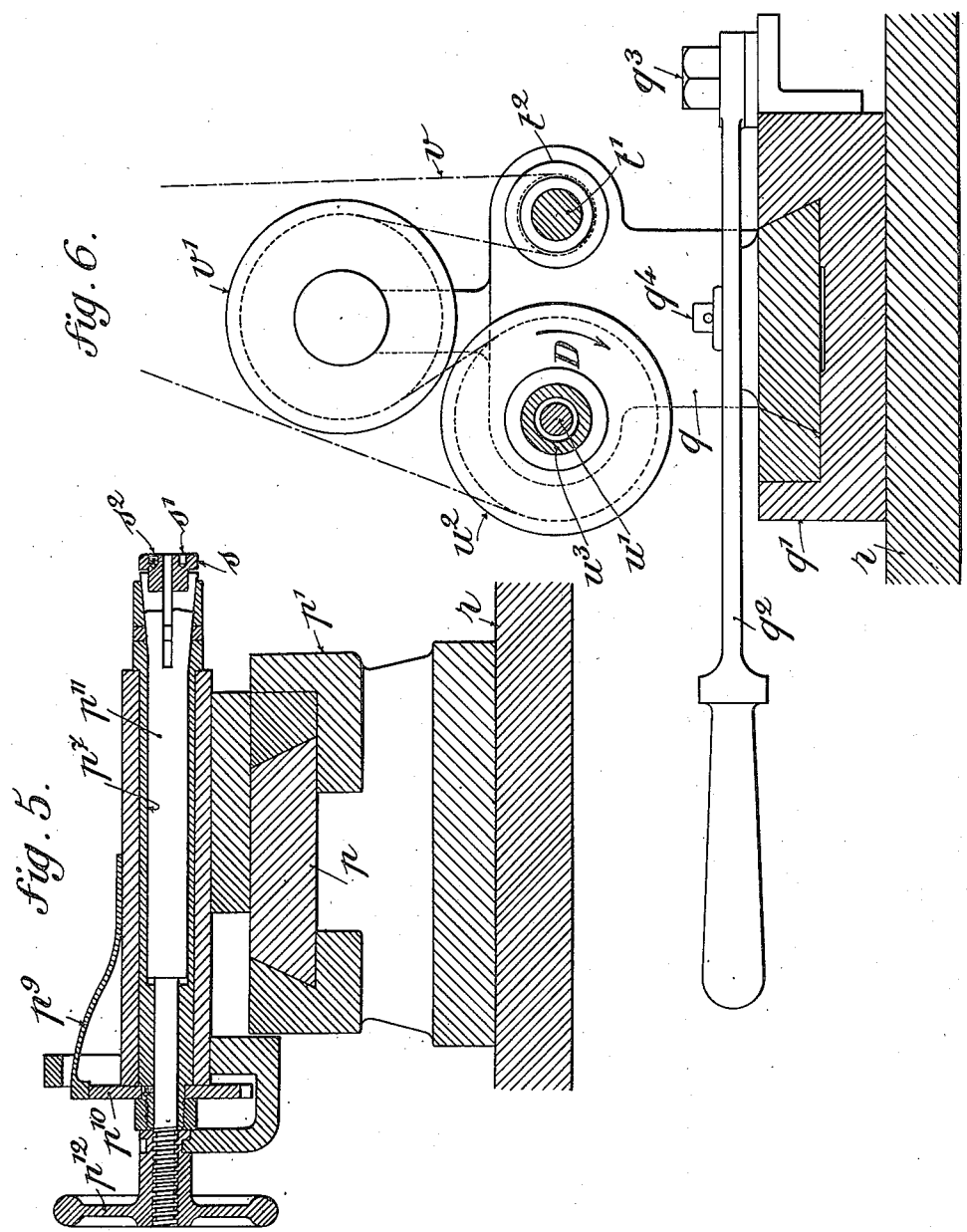

UNITED STATES PATENT OFFICE.

EMILE PEUCH, OF BOURGES, AND ALPHONSE ARBEY, OF BEURE, FRANCE.

DRILLING, SCREW-CUTTING, AND OTHER SIMILAR MACHINE.

1,254,933.   Specification of Letters Patent.   Patented Jan. 29, 1918.

Application filed July 17, 1913, Serial No. 779,535. Renewed December 18, 1917. Serial No. 207,797.

*To all whom it may concern:*

Be it known that we, EMILE PEUCH and ALPHONSE ARBEY, citizens of the Republic of France, residing the first at 12 Rue de l'Observatoire à Bourges, Cher, in the Republic of France, and the second at Beure, Doubs, in the Republic of France, engineers, have invented certain new and useful Improvements in Drilling, Screw-Cutting, and other Similar Machines, of which the following is a specification.

This invention relates to improvements in screw-cutting, drilling and other similar machines and more particularly to tool or piece carrying devices serving to catch and revolve either the tools or the pieces to be drilled, screw-cut and the like.

The invention consists in the first place in combining with such carrying devices one or more clutching devices operating by the axial displacement of one of the clutching parts with regard to the others and suitable means for displacing axially the said clutching parts for different purposes such for instance as that of clutching a drilling or screw-cutting tool alternatively with a driving member revolving in one direction and with another driving member revolving in the reverse direction or with a stationary member serving to stop such rotation.

The invention consists also in using a clutching device comprising a series of balls which are placed both in a circular ball-bearing on one of the clutching parts, and in recesses provided in the other clutching part, such recesses being so shaped that the balls are wedged between the two parts by an axial displacement of one of the latter with regard to the other.

Other features of the invention are described with reference to the accompanying drawings, in which:—

Figure 1 is an axial section of a tool-carrier with automatic clutching.

Figs. 2 and 2ª are transversal sections on the lines U—U and V—V of Fig. 1.

Figs. 3 and 3ª, which must be assembled on the line X—X, show a longitudinal section of a screw-cutting device having an automatic lock and stop and a quick return.

Figs. 4 and 4ª, which must be assembled on the line Y—Y, show a plan of a drilling and screw-cutting machine; in Fig. 4ª certain parts are shown in section.

Fig. 5 is a vertical section on the line Z—Z of Fig. 4, and Fig. 6 a vertical section on the line W—W of Fig. 4ª.

The tool-carrier shown in Figs. 1, 2 and 2ª is designed more particularly to receive a screw thread cutting tool; it comprises a set of balls $a$ placed between two members $b$ and $c$ the former of which has a circular ball-bearing $b^\times$ for the balls $a$ and the latter of which has a certain number of recesses $c^\times$, in its periphery to receive such respective balls; each of the recesses has, in the direction perpendicular to the axis of the members $b$ and $c$, a V shaped cross-section, and the bottom of such recess is inclined with regard to such axis, so that by a suitable axial displacement of one of the members with regard to the other, there can be obtained a clamping of the balls between the ball-bearing and the faces of the recesses, which then stops any rolling of the balls and, consequently, associates positively the member $c$ with the member $b$.

The member $b$ can be put in rotation in both directions by means of a controlling device reversing (not shown); the member $c$ is associated with the head of a screw thread cutting tool carrier $h$ by means of screws $h^1$; it can be displaced axially with regard to $b$ and is subjected to the action of a spring $d$ which tends to hold the balls $a$ wedged between $b$ and $c$. Such apparatus comprises also a pawl and ratchet device which can be reversed according as to whether the screw-cutting is to be done to the right or to the left, and which serves to rotate the screw thread cutting tool in the unscrewing direction; in this example, the pawl and ratchet device is constituted by the balls $i$ rolling in a circular groove $b^{\times\times}$ of the member $b$ and placed in the recesses $j$ of the screw thread cutting tool, the faces of such recesses being so inclined with regard to the direction of rotation as to produce the wedging of the balls $i$ and the rotating of the screw thread cutting tool in the desired unscrewing direction; the same balls may be placed in the recesses $j^1$, inclined in the opposite direction, to insure the unscrewing when the screw-cutting direction is changed.

The operation of such apparatus is as follows, assuming that the balls $i$ are placed in the recesses $j$, to produce screw-cutting to the right. The tool revolving in the direction of the arrow B and advancing in the direction of the arrow C, the reaction of the threaded object on the screw thread cutting tool coöperates with the action of the spring $d$ to hold the balls $a$ wedged between $b$ and $c$.

The present tool-carrier will be generally mounted on a carriage having reciprocatory motion, which will be pushed by the operator toward the piece to be threaded up to a position in which it is stopped by suitable means, and then bring it back to disengage the screw thread cutting tool from the threaded piece, by acting on an apparatus reversing which reverses at the same time the rotation of the tool-carrier. Such controlling means have not been shown in Figs. 1, 2 and $2^a$.

When the carriage carrying the tool reaches the end of its stroke, which is limited by a stationary stop, the operator acts on the running changer to produce the unscrewing of the screw thread cutting tool; it will be understood that if, at the time of the sudden stop of the carriage, the screw thread cutting tool were to remain clutched even for a very short time with the member $b$, there would be reason to fear a breakage of the screw-threads formed. Although the change of running cannot be effected instantaneously, such danger is now avoided because the screw thread cutting tool, in continuing to screw itself on the piece being worked after the sudden stop of the carriage, advances still farther in the direction of the arrow C and is, consequently, immediately unclutched from the member $b$. The latter can then continue to revolve without any inconvenience, as the screw thread cutting tool is no longer revolving on the threaded object. At this time, the balls $i$ allow furthermore of the stoppage of the screw thread cutting tool by reason of the inclination of the recesses $j$ in the suitable direction.

On the other hand, as soon as the running is changed, the screw thread cutting tool is carried in the unscrewing direction through the medium of the balls $i$. When the screw thread cutting tool is completely disengaged from the threaded piece, the member $c$ becomes free in the axial direction and is again clutched with the member $b$ under the action of the spring $d$; the apparatus is then ready for another operation.

If the screw-cutting is to be done to the left, the parts $h$ and $c$ are separated by unscrewing the screws $h^1$ and the balls $i$ are passed from the recesses $j$ to the recesses $j^1$.

Of course, it will be understood that instead of the stoppage by the balls $i$ and the recesses $j$, $j^1$, any other equivalent stoppage may be used.

The same apparatus can be adapted to receive a tapping device or other tools instead of a screw thread cutting die; it may also receive the piece to be worked, while the tool will be stationary.

Figs. 3 and $3^a$ show a screw threading device of the same kind as that of Figs. 1, 2 and $2^a$ but provided with braking devices and a quick return. The die holder $h$ differs from the former one by the omission of the clutch parts $l$, $j$ and $j^1$. It is mounted on the shaft $c^1$ mounted in the hollow shaft $b^1$ and coupled thereto by the balls $a$ by means of a spring $d$ between the shafts. The shaft $b^1$ is rotated by the belt pulley $e$ and is fixed against longitudinal movement on the carriage $k$ which is reciprocated by the operator by means of a lever $k^1$ through the medium of a toothed sector $k^2$ and rack $k^3$. The shaft $c^1$ carries at the end opposite the die holder a cup-shaped clutch member which coöperates with balls in turn coöperating with a stationary conical clutch member. These parts constitute a braking device for stopping rotation of the die carrying spindle. The work is held in the collet chuck $m$ carried by the hollow spindle or shaft $m^1$ (Fig. 3). The collet is formed on the end of a rod slidably carried in the shaft, the rear end of which carries an adjustable collar between which and the end of shaft $m^1$ a spring $m^2$ is arranged which holds the collet normally in closed position. The shaft $m^1$ is supported in the stationary bearing $f$ and is rotated by a belt driven pulley $b^3$ through a clutch, one element of which is formed in the pulley and the other element is normally urged into yielding engagement therewith. The movable clutch member $c^3$ is formed on a sleeve splined to the shaft $m^1$. Balls $a^3$ are interposed between the clutch members $b^3$ and $c^3$. The work is rotated at less speed than the die carrier but in the same direction, this resulting in a threading speed equal to the difference of the two speeds and also having the advantage of providing a rapid unthreading of the die or threading tool.

$n$ designates a screw pusher serving to push back the mandrel against the action of the spring $m^2$ so as to release the piece being worked; in this same movement, the pin $m^3$ carries axially forward the clutching member $c^3$ so that the latter is then unclutched and the rotation of the mandrel is brought to a stop.

The operation of this machine is as follows:—

During the screw-cutting, the piece being worked revolves at a speed $v$ without being displaced axially, while the screw-cutting tool revolves at a speed $V$ in advancing in the direction of the arrow C. At the time when the carriage bearing the tool is brought to a stop by a stationary stop (not shown), the tool continues to revolve and to advance for a short time, in becoming unclutched from the member $b^1$ as soon as it has been displaced axially with regard to the latter. Almost immediately, the member $c^2$ which is carried forward by it, clamps or locks the balls $a^2$ on the stationary piece $k^4$ so that the rotation of the tool-carrier is brought to a stop. On account of such stoppage, the relative speed of the tool and of the piece being worked becomes $-v$ instead of $V-v$; so it is changed in direction and becomes greater in absolute value; so that the unscrewing is produced at a rapid rate. During such unscrewing, the operator pushes the carriage in a direction reverse to the arrow C so as to maintain between the threads of the tool and the screw-cut piece such a reaction that the balls $a^2$ remain wedged between $c^2$ and $k^4$ and that the balls $a$ remain free between $b$ and $c$. When the threads are disengaged from one another, the spring $d$ restores the member $c^1$ to the normal position in releasing it from the stop piece $k^4$ and in clutching the same again with the carrying forward member $b^1$. Then, all that need be done is to operate the pusher $n$ to disengage the piece worked from the mandrel $m$; afterward a fresh piece can be secured in the mandrel and can be worked in the same manner as the previous one.

The machine so fitted is an extremely simple one, exempt from any cumbersome mechanism and can be easily and quickly handled; it can be adapted to do any screw-cutting or forming work.

Figs. 4 to 6 show a drilling and screw-cutting machine, comprising a work-bearing carriage $p$, a tool-bearing carriage $q$, and a main frame $r$ on which are secured the slide-ways $p^1$, $q^1$ serving to guide such carriages in two perpendicular directions.

The displacement of the work-bearing carriage $p$ is obtained for instance by means of an eccentric $p^2$ provided with an operating lever $p^3$ and a link $p^4$ connecting such eccentric with the carriage; the displacements of the latter are limited by two abutting screws $p^5$ and $p^6$.

The piece to be worked $a$ is secured to a mandrel $p^7$ which can be turned by means of a lever $p^8$ and can be fixed in the required positions by means of a spring stop $p^9$ which engages in the slots of a plate $p^{10}$ associated with the said mandrel; this arrangement is for the purpose of allowing the drilling and the screw-cutting of several holes in the same piece $a$ without having to dismount the latter.

The fastening of the piece $a$ in the mandrel $p^7$ is obtained by means of a slidable rod $p^{11}$ one end of which is enlarged in conical shape, recessed to receive the piece $a$ and split in the form of a cross, while the other end is screw-threaded and carries a hand wheel $p^{12}$ forming a nut.

The tools consist of a drill $t$ and of a tap $u$, mounted on two parallel shafts $t^1$ and $u^1$ carried by the carriage $q$.

The shaft $t^1$ carries a pulley $t^2$ and is moved continuously by a strap in the direction of the arrow D.

The same strap passes around a transmission pulley and a pulley $u^2$, the latter being associated with a sleeve $u^3$ which surrounds the shaft $u^1$. Both the pulleys $t^2$ and $u^2$ revolve in the same direction.

Around the shaft $u^1$ is placed another sleeve $u^4$ provided with a pulley $u^5$ which is revolved continuously in the direction reverse to the arrow D by means of a strap (not shown).

The shaft $u^1$ carrying the tap can be coupled alternatively with the sleeves $u^3$ and $u^4$ by means of clutching devices of the kind hereinbefore described; a set of balls $a^4$ are placed in the circular ball-bearing $b^\times$ of the sleeve $u^3$ and in inclined recesses $c^\times$ which are made in an enlarged part of the shaft $u^1$, the inclination of the said recesses being such that the wedging is produced when the shaft is displaced in the direction reverse to the arrow C with regard to the sleeve $u^3$; furthermore, a set of balls $a^5$ are placed in the ball-bearing $b^\times$ of the sleeve $u^4$ and in the inclined recesses $c^\times$ which are made in the annular ring $c^4$ secured on the shaft $u^1$, the inclination of the said recesses being such that the wedging is produced when the shaft $u^1$ is displaced in the direction of the arrow C.

The shaft $u^1$ is indeed slidable in the sleeves $u^3$ and $u^4$; a spring $d$ bearing on the sleeve $u^3$ pushes the same constantly in the direction reverse to the arrow C.

To displace the carriage $q$, the operator operates with the right hand a lever $q^2$ jointed at $q^3$ to the slideway and at $q^4$ to the carriage $q$.

Assuming that it is desired to bore and screw-thread two holes $s^1$ and $s^2$ in the piece $s$.

The operator, holding in the first place the latter in his right hand, turns with his left hand the hand wheel $p^{12}$ so as to open the split head of the rod $p^{11}$ and he places in the latter the piece $s$ in giving it a suitable direction; then he turns the hand-wheel $p^{12}$ so as to tighten the said split head onto the piece $s$. With his left hand, he operates the lever $p^3$ so as to bring the carriage $q$ against the screw $p^5$; the point of the piece $s$ where the hole $s^1$ is to be bored is thus brought in front of the drill $t$. In pushing the lever $q^2$ with his right hand, the operator then pushes the carriage $q$ in the direction of the arrow C, so that the drill, which revolves continuously, bores the hole $s^1$. When the carriage $q$ is brought to a stop by the abutting screw $q^5$, the operator brings it back in the direction reverse to the arrow C, so as to remove the drill from the hole.

Then the operator turns the lever $p^8$ so as to revolve the mandrel and the piece $s$ to such an angle that the point of the piece $s$ where the second hole $s^2$ is to be made is brought in front of the drill. Such second hole is then bored in the same manner as the previous one.

Afterward, the operator turns the lever $p^8$ so as to bring the carriage $p$ against the screw $p^6$, the latter being so regulated that the hole $s^2$ comes in front of the tap $u$. The carriage $q$ being pushed toward the piece $s$, the tap is engaged in the hole $s^2$ and produces the screw-threads therein by reason of the fact that the resistance opposed to its advance is added to the action of the spring $d$ for the purpose of wedging the balls $a^4$ in the corresponding recesses and of getting the shaft $u^1$ carried forward by the sleeve $u^3$. When the carriage impinges against the screw $q^5$, the shaft $u^1$ continues to advance slightly only on account of the screwing of the stock into the hole $u^2$, so that the wedging of the balls $a^4$ ceases and the shaft $u^1$ is unclutched; so the stoppage of the tap is produced automatically.

The operator then brings the carriage $q$ back in direction reverse to the arrow C by means of the lever $q^2$; the sleeve $u^4$, which revolves in the direction inverse to the arrow D, carries forward the shaft $u^1$ through the medium of the balls $a^5$, thus producing the unscrewing of the tap $u$ from the hole $s^2$. As soon as the tap is disengaged, the spring $d$ pushes the shaft $u^1$ slightly in the direction reverse to the arrow C, so that it is unclutched from the sleeve $u^4$ and clutched again with the sleeve $u^3$.

The mandrel afterward is so turned as to bring the hole $u^1$ to the place of the hole $u^2$ and such hole $u^1$ is then screw-threaded in the same manner as the previous one.

It will be understood that the machine just described can be modified by the addition of other tools, drills, threading dies and the like, before which the pieces to be worked would be brought successively.

The clutching devices having balls of the character described may also be replaced by other clutching devices having a wedging, frictional or other similar effect.

Claims:

1. In a device of the character described, a sleeve having on one end a cup-shaped enlargement provided with an interior annular groove; a shaft in said sleeve and having a head having longitudinal grooves therein; a spring on said shaft and yieldably drawing said head into said cup; and balls engaging in said annular groove and each engaging in one of said longitudinal grooves.

2. In a machine of the character described, the combination of a carriage; a sleeve journaled in said carriage and having an enlarged member at the inner end; a pulley on said sleeve; a shaft passing through said sleeve and having an enlarged member on the outer end, and one on the inner end associated with said first named member; an additional member associated with said member at the outer end of said shaft; one of each pair of adjacent associated members being provided with an annular groove, and the other with a plurality of longitudinal grooves; and balls in said annular grooves and each engaging a longitudinal groove.

3. In a screw-cutting machine the combination of a carriage; a sleeve journaled in said carriage; and having at its outer end a cup having an annular groove therein; a pulley on said sleeve; a shaft passing freely through said sleeve and having at the inner end a flaring head having longitudinal grooves therein; balls each engaging in one of said longitudinal grooves and the annular groove; a spring around said shaft and yieldably drawing said head in said cup; an enlarged member on the outer end of said shaft; an enlarged member carried on the carriage; one of said members having a face provided with longitudinal grooves, the other member having an annular groove; and balls each engaging in said last named annular groove and one of said last named longitudinal grooves.

In testimony, that we claim the foregoing as our invention we have signed our names in presence of two subscribing witnesses.

EMILE PEUCH.
ALPHONSE ARBEY.

Witnesses:
  LEON RIMONDY,
  MAURICE ROUX.